United States Patent
Wierzchon

(10) Patent No.: US 11,612,994 B2
(45) Date of Patent: Mar. 28, 2023

(54) TOOL HAVING COMPOSITE HOUSING

(71) Applicant: Robert Bosch GmbH, Stuttgart (DE)

(72) Inventor: Peter Wierzchon, Morton Grove, IL (US)

(73) Assignee: Robert Bosch GmbH, Stuttgart (DE)

( * ) Notice: Subject to any disclaimer, the term of this patent is extended or adjusted under 35 U.S.C. 154(b) by 168 days.

(21) Appl. No.: 16/940,694

(22) Filed: Jul. 28, 2020

(65) Prior Publication Data
US 2022/0032441 A1     Feb. 3, 2022

(51) Int. Cl.
| | |
|---|---|
| *B25F 5/02* | (2006.01) |
| *B25C 1/04* | (2006.01) |
| *B32B 27/06* | (2006.01) |
| *B32B 7/12* | (2006.01) |
| *B32B 5/18* | (2006.01) |
| *B23D 47/02* | (2006.01) |

(52) U.S. Cl.
CPC ............... *B25F 5/02* (2013.01); *B25C 1/047* (2013.01); *B32B 5/18* (2013.01); *B32B 7/12* (2013.01); *B32B 27/065* (2013.01); *B23D 47/02* (2013.01); *B32B 2266/025* (2013.01); *B32B 2274/00* (2013.01); *B32B 2307/72* (2013.01)

(58) Field of Classification Search
CPC ......... B25F 5/02; B32B 5/14; B32B 2307/72; B32B 2274/00; B32B 7/12
See application file for complete search history.

(56) References Cited

U.S. PATENT DOCUMENTS

| | | |
|---|---|---|
| 5,786,394 A | 7/1998 | Slaven |
| 6,955,167 B2 | 10/2005 | Baratta |
| 7,018,279 B2 | 3/2006 | Baratta |
| 7,757,684 B2 | 7/2010 | Baratta |
| 8,556,739 B2 | 10/2013 | Kopf et al. |
| 2008/0148524 A1 | 6/2008 | Wiker et al. |
| 2014/0004292 A1 | 1/2014 | Mazur et al. |
| 2015/0196363 A1* | 7/2015 | Aman ................ A61B 17/1622 53/425 |

(Continued)

FOREIGN PATENT DOCUMENTS

GB     2050213     1/1981

OTHER PUBLICATIONS

Density of Polymers WWW.amesweb.info (Year: 2018).*
Density of Metals WWW.engineersedge.com (Year: 2017).*

*Primary Examiner* — Daniel Jeremy Leeds
(74) *Attorney, Agent, or Firm* — Kelly McGlashen; Maginot, Moore & Beck LLP

(57) ABSTRACT

A power tool includes a tool housing and a mechanism disposed inside the tool housing. The tool housing has a composite structure that includes an outer layer and an inner layer. The outer layer provides an outer surface of the power tool housing and comprises a first material. The outer layer is an assembly of concave shell portions joined along parting lines. The inner layer is disposed on an inner surface of at least a portion of the outer layer so as to be disposed between the portion of the outer layer and the mechanism. The inner layer comprises a second material. The first material has a density that is at least three times the density of the second material. The inner layer has a peripheral edges that are offset relative to the parting lines such that the inner layer extends continuously across the parting lines.

17 Claims, 7 Drawing Sheets

(56) References Cited

U.S. PATENT DOCUMENTS

2015/0306757 A1* 10/2015 Smith .................... B25F 5/006
                                                      173/162.1
2019/0059535 A1* 2/2019 Vannier .................... B32B 7/12
2019/0168372 A1* 6/2019 Aoki ....................... B24B 23/04

* cited by examiner

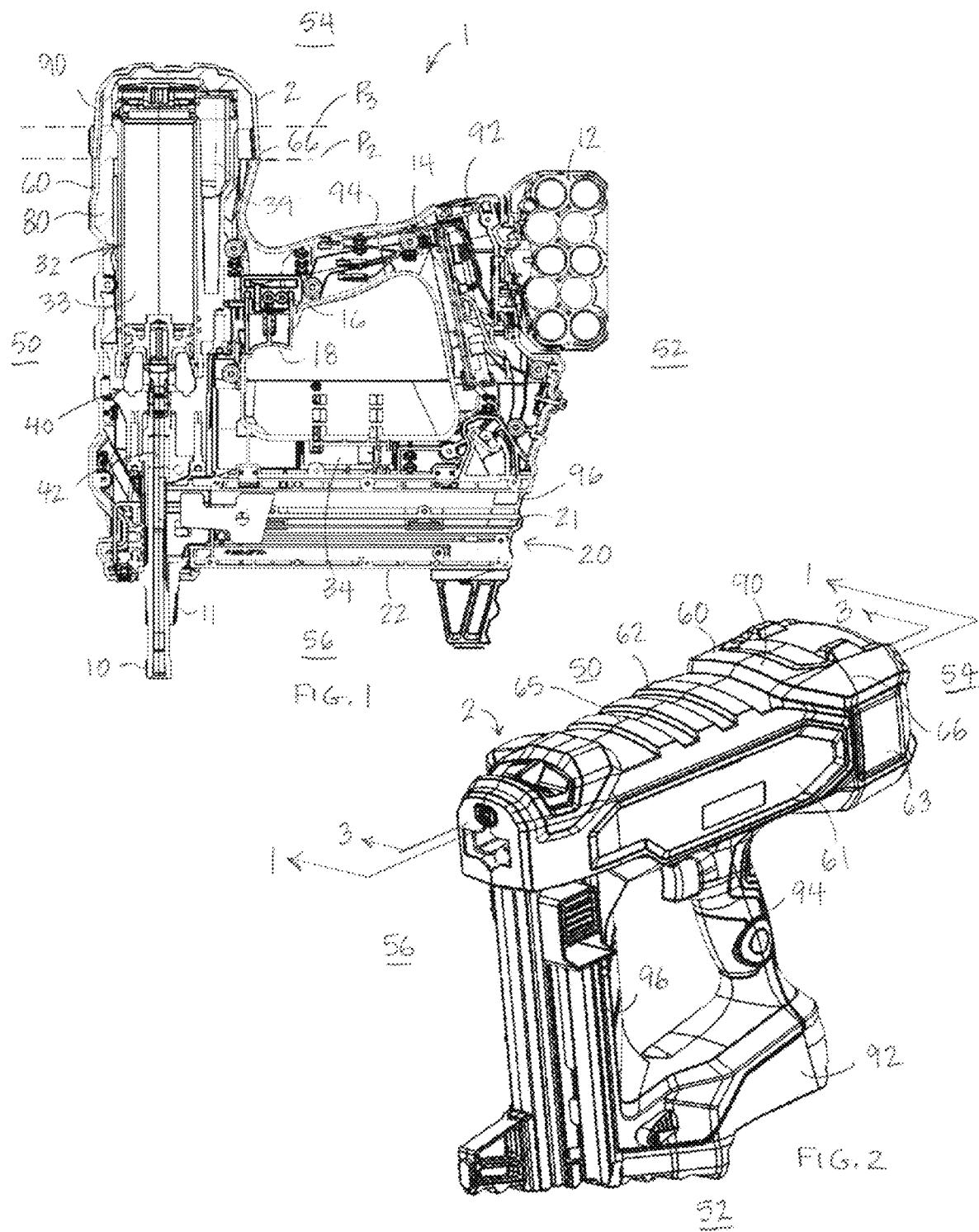

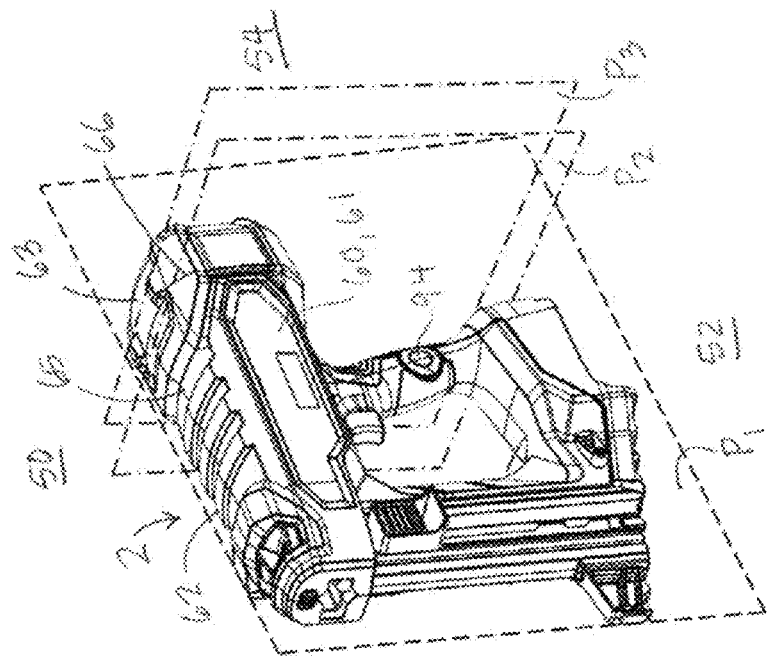
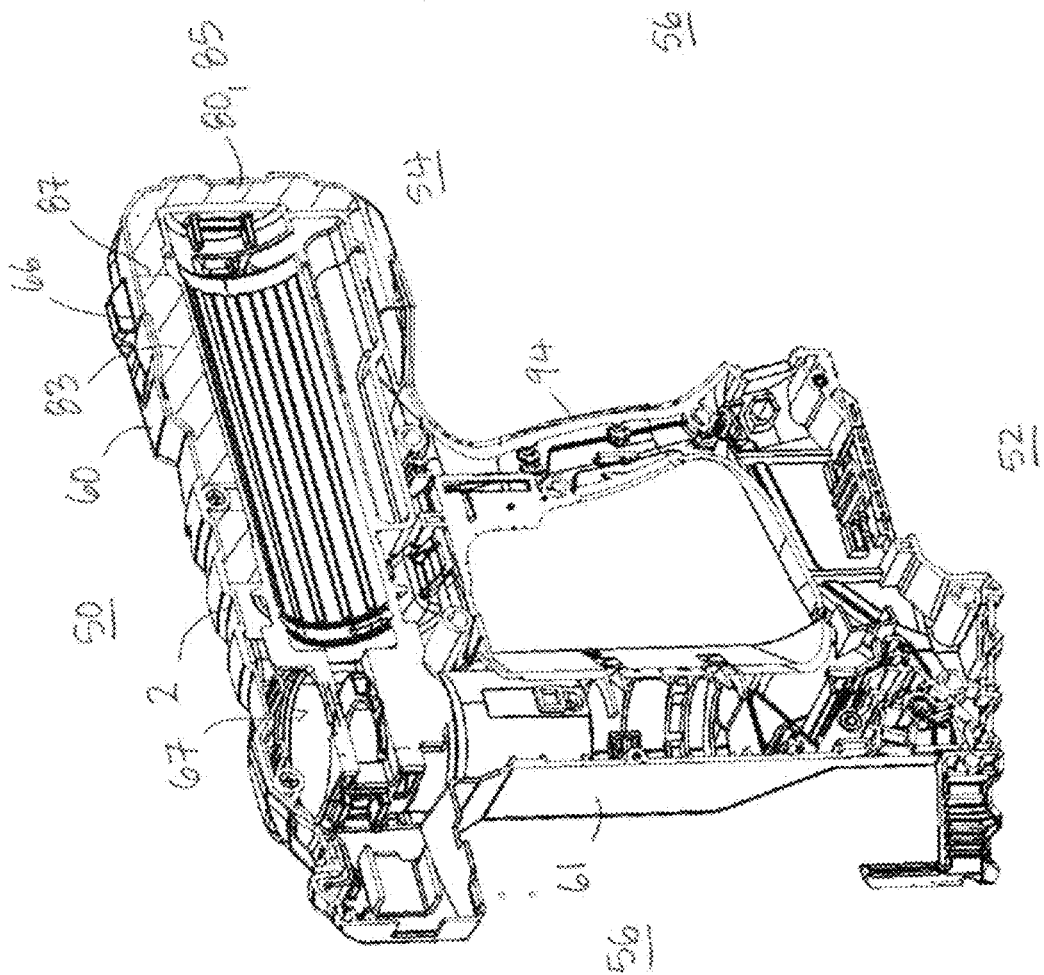

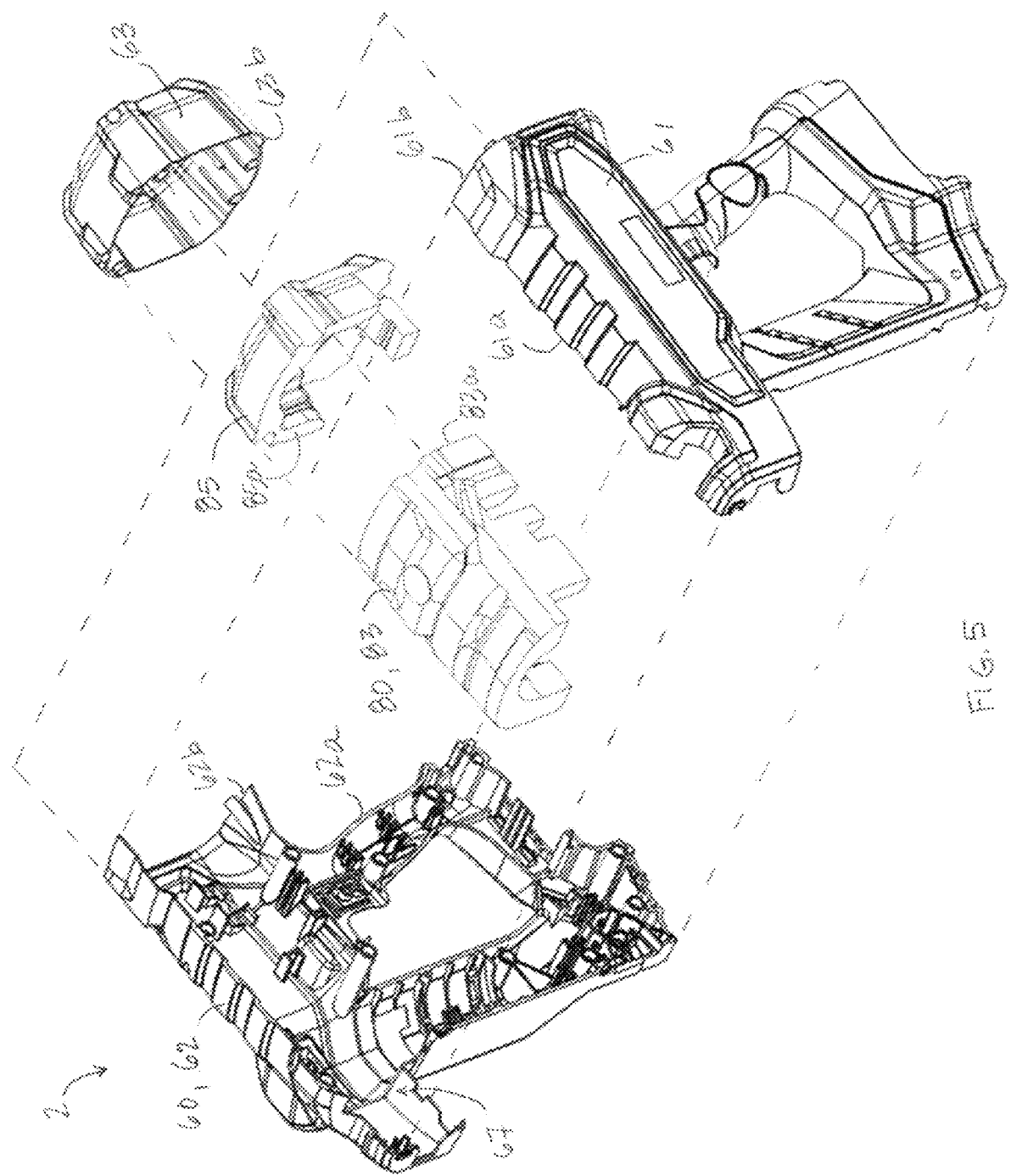

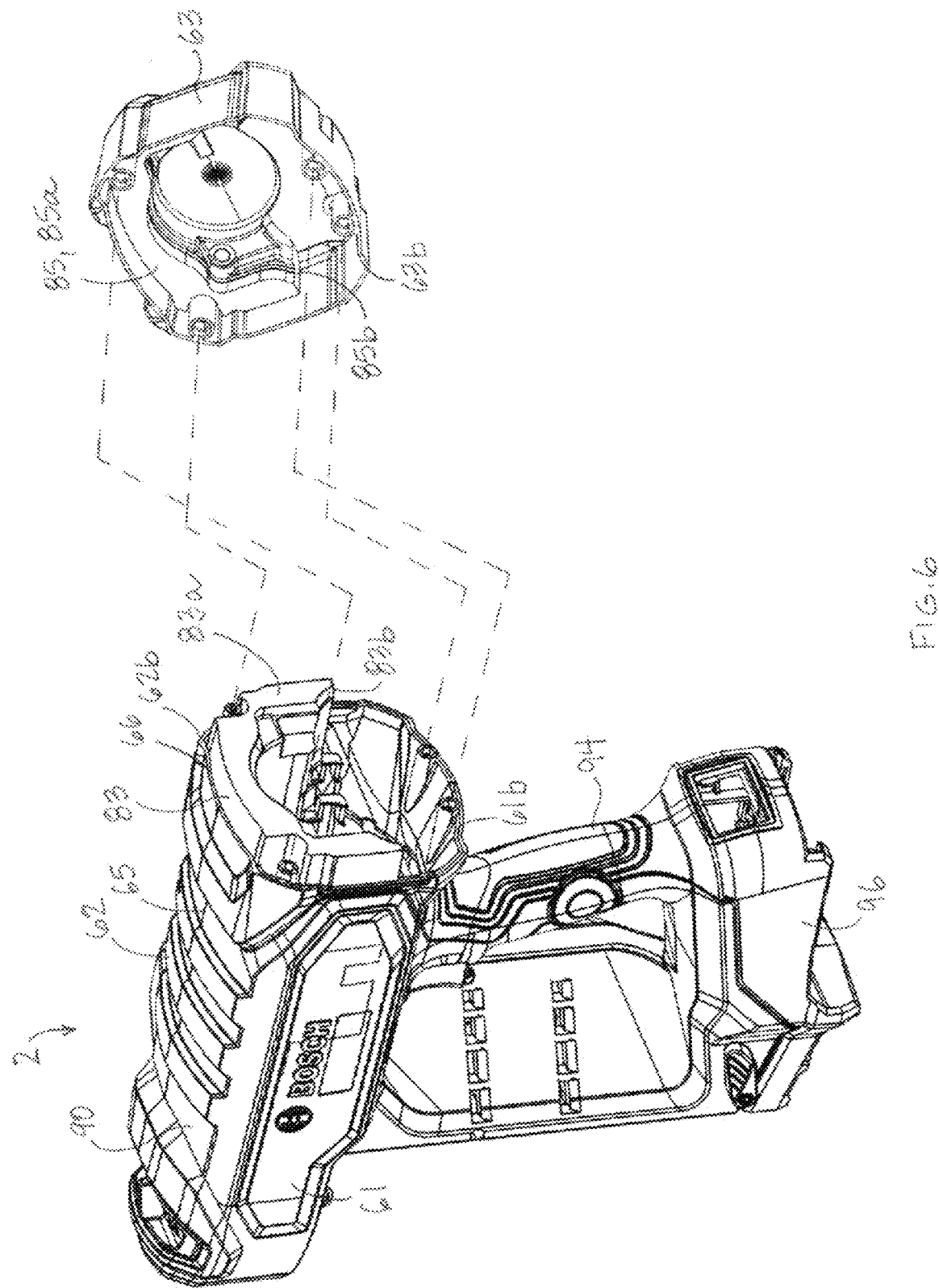

TOOL HAVING COMPOSITE HOUSING

BACKGROUND

Power tools, including hand-held, desk-top and cabinet-type tools, employ a structural housing that fulfills a variety of functions including providing impact protection to all internal mechanical and electrical components, supporting the internal mechanisms and motor, providing dielectric isolation and providing thermal isolation and thermal management features. In addition, the housing creates the necessary ergonomic interfaces for the user, protects the user from moving parts and creates a protective structure with the appropriate flame rating.

Some conventional power tools employ a molded plastic housing that provides a structural shell around the working mechanism. The thickness of the shell, in some cases combined with reinforcing ribs, provides a housing that performs the functions described above.

In one example, the housing of a hand-held power tool may include a structural shell that is a monolithic element with a near constant wall thickness. In some cases, a thermoplastic elastomer (TPE) such as styrene-ethylene-butylene-styrene (SEBSJ) or other appropriate material may be overmolded onto the outer surface of the shell to provide an improved tactile grip (e.g., a "soft grip") and user ergonomics, but the overmolded material has minimal effect on the structural integrity of the tool housing. The internal cavity of the housing contains a rib structure that stiffens the Shell and provides the mechanical supports for the motor, gearbox, switches, electronics, battery, etc. When the tool has a substantial weight (for example, greater than 4 pounds), the wall thickness and number of ribs is increased to withstand user forces and impact forces from rough field usage and impact loads due to inadvertent drops. In addition to adding weight to the tool, the rib structure also has undesirable characteristic of creating a concentrated load path to the underlying mechanism. Any impact loads are only slightly diminished by the outer shell and ribs before they reach the mechanism.

For cordless tools, the battery adds to the total tool weight. This issue has become more critical as larger and higher output batteries are used, which contribute a larger portion of the total tool weight. This creates an unwelcome progression toward further increasing wall thickness and adding more internal ribs to increase the housing stiffness and maintain the desired durability. Even with optimization techniques, the housing wall and ribbing become substantial, and can lead to unwanted external sink marks and a heavier and more costly housing.

SUMMARY

In some aspects, a power tool includes a tool housing having a composite housing structure that significantly improves durability and efficiently manages the impact energy during impact loading. In the power tool housing, the conventional rigid housing shell is replaced by a composite structure that uses two different material layers to create controlled deformation and manage impact energy. The outer composite layer is thinner than a conventional (non-composite) housing for the same tool, and is formed of a more compliant material that is designed for controlled deformation without cracking. The inner composite layer supports the outer layer, and is a rigid polymer foam or flexible polymer foam.

Advantageously, the composite housing provides significant weight reduction benefits. Since the wall thickness of the outer shell is reduced relative to some conventional tool housings to create a durable structure, there is an immediate weight reduction in the overall tool. Since all or most of the internal ribbing can be replaced by a continuous or nearly continuous foam structure, the weight of the tool is further reduced. This construction is well suited for lightweight and cost effective energy management in power tool housings.

Further advantageously, for a hand-held tool, it is understood that the composite structure creates a more durable structure. For larger, non-hand held power tools, such as table saws, the composite structure creates a significant structural element. In the case of a table saw, the main housing becomes a large box feature that enhances the structure and adds rigidity to the tool. In addition, polymer foam layer facilitates the attachment of metal and non-foam elements in the molding process.

In some aspects, a power tool includes a tool housing and a mechanism disposed inside the tool housing. The tool housing includes an outer layer that provides an outer surface of the power tool housing. The outer layer is comprised of a first material. The tool housing includes an inner layer disposed on an inner surface of at least a portion of the outer layer. The inner layer is comprised of a second material. The first material has a density that is at least three times the density of the second material.

In some embodiments, the outer layer is an assembly of a concave first shell portion and a concave second shell portion, the first shell portion is joined together with the second shell portion along a first parting line to provide an enclosed interior space that receives the mechanism, the inner layer is disposed between the portion of the outer layer and the mechanism, and the inner layer has a first peripheral edge portion that is offset relative to the first parting line such that the inner layer extends continuously across the first parting line.

In some embodiments, the outer layer is an assembly of the first shell portion, the second shell portion and a concave third shell portion, the third shell portion is joined together with the first shell portion and the second shell portion along a second parting line to provide the enclosed interior space that receives the mechanism, and the inner layer has a second peripheral edge portion that is offset relative to the second parting line such that the inner layer extends continuously across the second parting line.

In some embodiments, the inner layer is an assembly of a first inner layer portion and a second inner layer portion, the first inner layer portion abuts the second inner layer portion along a third parting line, and the third parting line is spaced apart from the second parting line.

In some embodiments, the inner layer underlies the outer layer such that an outward facing surface of the inner layer faces the inward-facing surface of the outer layer without any intervening structures, and the inner layer is free from adhesion to, and bonding to, the outer layer.

In some embodiments, an inward-facing surface of the outer layer is free of structurally reinforcing protrusions at locations that face the inner layer.

In some embodiments, the outer layer has a non-uniform thickness such that the outer layer has a first thickness in a first region of the tool housing and a second thickness in a second region of the tool housing, the first thickness is less than the second thickness, and the inner layer is disposed on an inner surface of outer layer within the first region of the tool housing.

In some embodiments, the power tool is a hand-held fastener driving tool that includes the mechanism disposed at first end of the tool housing, the mechanism including a fastener driving mechanism. The tool also includes a power supply disposed at a second end of the tool housing; and a handle that extends between the first end and the second end. The first region of the tool housing includes the first end, and the second region of the tool housing includes the handle.

In some embodiments, the power tool housing includes a cabinet portion that receives, the mechanism, a planar work surface that is supported on the cabinet portion and support members that are configured to support the cabinet portion relative to an external support surface. The first region of the tool housing corresponds to the cabinet, and the second region of the tool housing corresponds to the support members.

In some embodiments, the first material is a thermoplastic polymer, and the second material is a polymer foam.

In some embodiments, a thickness of the inner layer is at least 1.5 times the thickness of the outer layer.

In some aspects, a power tool includes a tool housing and a mechanism disposed inside the tool housing. The tool housing includes an outer layer that provides an outer surface of the power tool housing, and an inner layer disposed on an inner surface of at least a portion of the outer layer. The outer layer is an assembly of a concave first shell portion and a concave second shell portion. The first shell portion is joined together with the second shell portion along a first parting line to provide an enclosed interior space that receives the mechanism. The inner layer is disposed between the portion of the outer layer and the mechanism. In addition, the inner layer has a first peripheral edge portion that is offset relative to the first parting line such that the inner layer extends continuously across first the parting line.

In some embodiments, the outer layer comprises a first material, the inner layer comprises a second material, and the first material has a density that is at least three times the density of the second material.

In some embodiments, the outer layer is an assembly of the first shell portion, the second shell portion and a concave third shell portion. The third shell portion is joined together with the first shell portion and the second shell portion along a second parting line to provide the enclosed interior space, and a second peripheral edge portion of the inner layer is offset relative to the second parting line such that the inner layer extends continuously across the second parting line.

In some embodiments, the inner layer is an assembly of a first inner layer portion and second inner layer portion. The first inner layer portion abuts the second inner layer portion along a third parting line, and the third parting line is spaced apart from the second parting line.

In some embodiments, the inner layer underlies the outer layer such that an outward facing surface of the inner layer faces the inward-facing surface of the outer layer without any intervening structures, and the inner layer is free from adhesion to, and bonding to, the outer layer.

In some embodiments, the outer layer has a non-uniform thickness such that the outer layer has a first thickness in a first region of the tool housing and a second thickness in a second region of the tool housing. The first thickness is less than the second thickness, and the inner layer is disposed on an inner surface of outer layer within the first region of the tool housing.

In some embodiments, the power tool is a hand-held fastener driving tool that includes the mechanism disposed at first end of the tool housing. The mechanism includes a fastener driving mechanism. The tool further includes a power supply disposed at a second end of the tool housing and a handle that extends between the first end and the second end. The first region of the tool housing includes the first end, and the second region of the tool housing includes the handle.

BRIEF DESCRIPTION OF THE FIGURES

FIG. 1 is a side cross-sectional view of a wireless, hand-held, linear fastener driving tool that includes a composite housing, as seen along line 1-1 of FIG. 2.

FIG. 2 is a perspective view of the composite housing of the linear fastener driving tool of FIG. 1.

FIG. 3 is a perspective cross-sectional view of the linear fastener driving tool of FIG. 1, as seen along line 3-3 of FIG. 2 and in which some non-housing elements of the tool are omitted to permit clear visualization of the composite housing.

FIG. 4 is a reproduction, of FIG. 2, illustrating the location of reference planes P1, P2 and P3 with respect to the composite housing.

FIG. 5 is an exploded perspective view of the composite housing of FIG. 1 in which non-housing elements of the tool are omitted to permit clear visualization of the composite housing.

FIG. 6 is a partially exploded perspective view of the composite housing of FIG. 1 in which non-housing elements of the tool are omitted to permit clear visualization of the composite housing.

DETAILED DESCRIPTION

Figure 7:
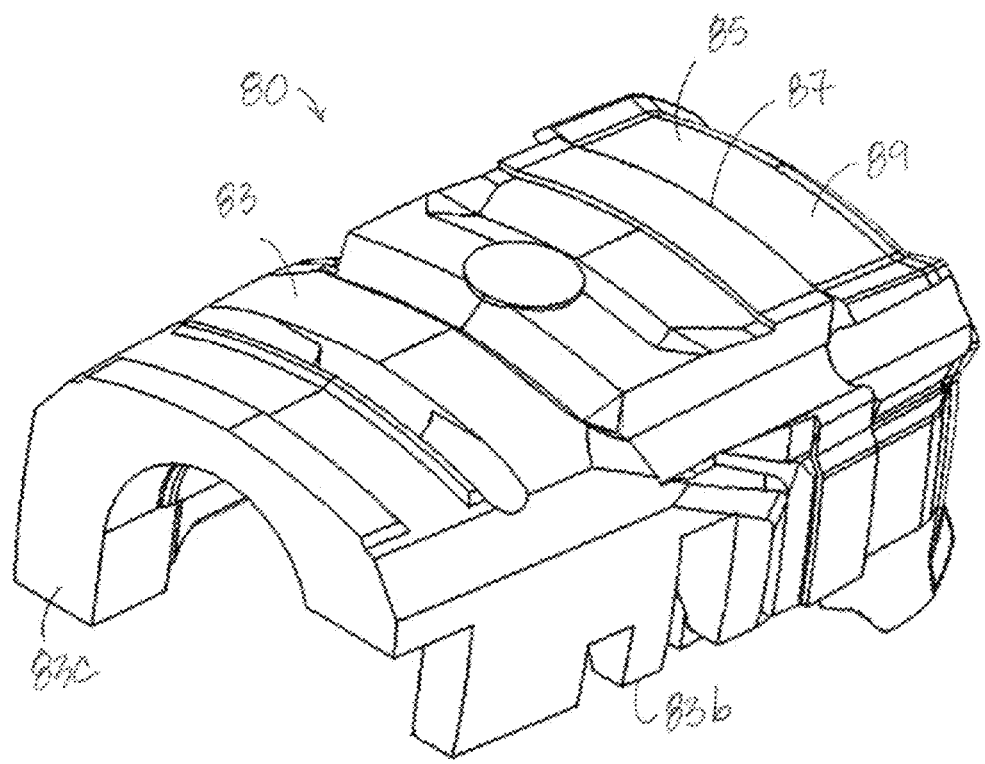
FIG. 7 is perspective view of the assembled housing inner layer as seen from the bottom and front of the tool.
Figure 8:
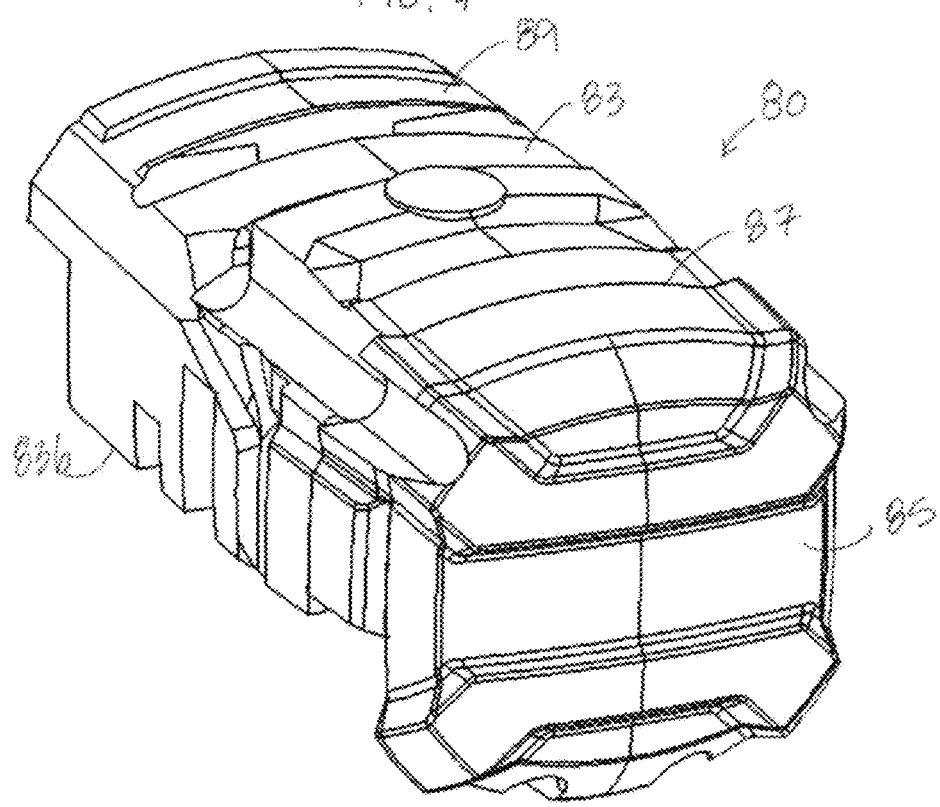
FIG. 8 is a perspective view of the assembled housing inner layer as seen from the top and front of the tool.
Figure 9:
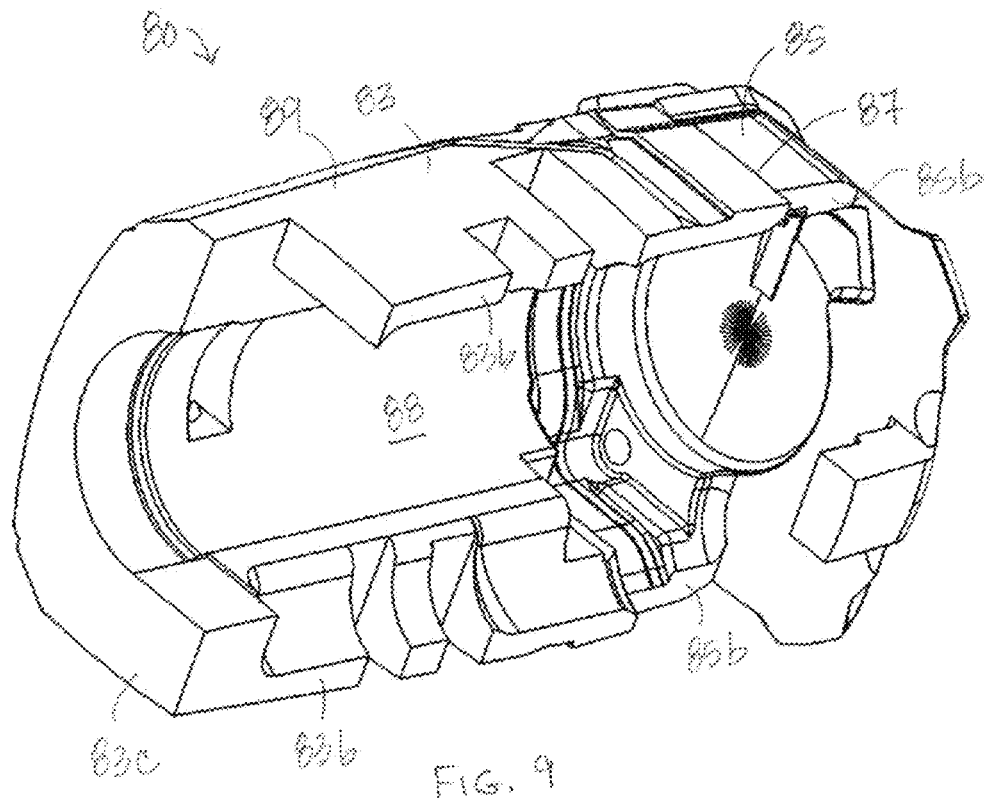
FIG. 9 is a perspective view of the assembled housing inner layer as seen from the bottom and rear of the tool.
Figure 10:
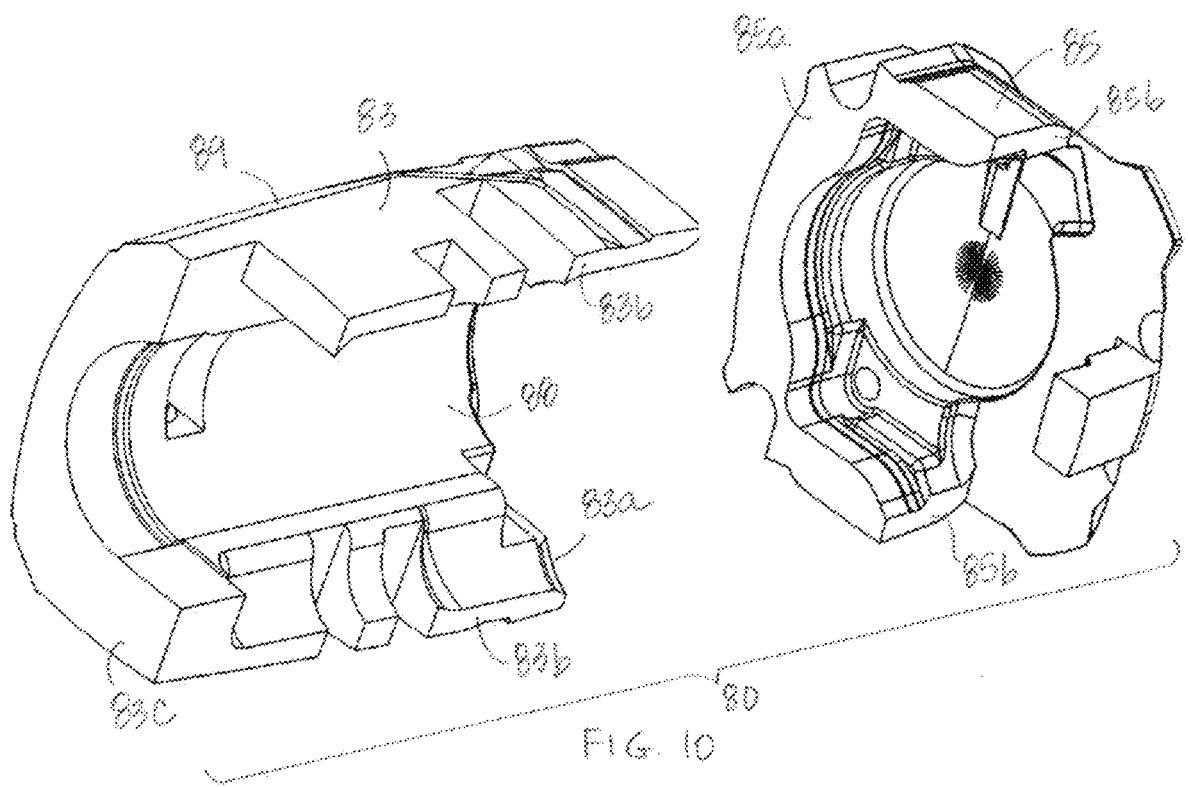
FIG. 10 is an exploded view of the housing inner layer of FIG. 9.

Referring to FIGS. 1-4, a power tool 1 includes a tool housing 2 that is a composite of an outer layer 60 of a first material and an inner layer 80 of a second material, where the first material is different than the second material. By employing the two layer composite structure described herein, the tool housing 2 allows controlled deformation and manages impact energy in the event the tool housing 2 experiences an impact, for example due to being dropped or having something dropped on it. The composite tool housing 2 weighs less and is more durable than some conventional tool housings as a result of a novel structure, as discussed in detail below.

References to direction recited herein such as above, below, front (see reference number 50), rear (see reference number 52), top (see reference number 54), bottom (see reference number 56), forward, rearward, upper, lower, etc., are used with respect to orientation of the tool 1 illustrated in FIG. 1, and are not intended to be limiting since the tool 1 can be used in other orientations in space without departing from the principles of the present invention.

In the illustrated embodiment, the power tool 1 is a hand-held, linear fastener driving tool such as a gas nailer that is designed to linearly drive fasteners such as nails and staples. The power tool 1 includes a fastener drive mechanism 32, a fastener drive reset mechanism 40, a fastener feed mechanism 20 and a fastener magazine 21. In addition, the power tool 1 includes a detachable battery pack 12. The fastener drive mechanism 32 includes cylinder 33 and a piston (not shown) that is movable within the cylinder 33 along an axis that extends between the top 54 and bottom 56 of the tool housing 2. The fastener drive mechanism 32 includes a gas reservoir 39 that communicates with the cylinder 33 and contains a fixed volume of non-flammable gas. A blade 42 protrudes from the piston so as to extend out of the cylinder 33. The fastener drive reset mechanism 40 lifts the piston and compresses the gas within the reservoir 39 to a high pressure. This configuration corresponds to a "ready to fire" state of the power tool 1. When the user pulls the trigger 18 (e.g., "fires the tool"), the motor 34 rotates, releasing the piston and the blade 42. The compressed gas within the cylinder 33 expands and drives the piston within the tool housing 2, whereby the blade 42 advances from the tool housing 2 in a driving stroke. While being advanced, the blade 42 receives a fastener from the fastener feed mechanism 20 and propels the fastener into a workpiece. Upon completion of this driving stroke, the lift mechanism 40 returns the piston and blade 42, compressing the fixed volume of gas to a higher pressure, in readiness for a subsequent nailing operation.

The fastener drive mechanism 32 is disposed in a main housing section 90 of the tool housing 2 which is located at the front 50 of the power tool 1, and the detachable battery pack 12 is connected to a battery connection section 92 of the tool housing 2, which is located at the rear 52 of the power tool 1. The fastener drive reset mechanism 40 is disposed in the main housing section 90 so as to reside below the fastener drive mechanism 32 along the front 50 of the power tool 1. The power tool 1 includes a fastener exit portion 10 and a guide body 11 that protrude from the tool housing 2 below the fastener drive reset mechanism 40.

The tool housing 2 includes a grip section, or handle 94, that serves as a hand grip and extends between the main housing section 90 and the battery connection section 92. In this configuration, the handle 94 forms an upper, mid portion of the tool housing 2. The handle 94 is hollow and a trigger switch 16 is disposed in the handle 94. The trigger switch 16 is activated by a trigger 18 that protrudes from a bottom-facing surface of the handle 94. As can been seen in FIG. 1, the handle 94 is designed for gripping by a human hand, and the trigger 18 is designed for actuation by a user's finger while gripping the handle 94.

The power tool 1 includes a printed circuit board 14 that is disposed in the interior space of the battery connection section 92. The printed circuit board 14 supports a controller (not shown). The trigger switch 16 and other devices provide inputs to the controller. The controller may include a microprocessor or a microcomputer device that acts as a processing circuit. At least one memory circuit will may also be part of the controller, including Random Access Memory (RAM) and Read Only Memory (ROM) devices. To store user-inputted information (if applicable for a particular tool model), a non-volatile memory device may be included, such as EEPROM, NVRAM, or a Flash memory device.

The fastener feed mechanism 20 and corresponding fastener magazine 21 are disposed in a secondary housing section 96. The secondary housing section 96 is disposed below the handle 94 and battery pack 12, and extends generally in parallel with the handle 94 so as to communicate with the guide body 11. An electric motor 34 that is used to drive the fastener drive reset mechanism 40 is disposed in the secondary housing section 96 so as to reside between the handle 94 and the fastener magazine 21. The electric motor 34 has an output that drives a gear set 35. An output of the gear set drives the fastener drive reset mechanism 40. The electric motor 34 may be, for example, an electric brushless DC motor.

The fastener magazine 21 includes a magazine housing 22, and a fastener track (not shown) is disposed in the magazine housing 22. The individual fasteners (for example, a nail) are moveable within the magazine 6. A feeder carriage (not shown) is disposed in the magazine housing 22, and is used to feed an individual fastener from the magazine 6 into the fastener drive mechanism 32. In the illustrated embodiment, the feeder carriage positions a fastener in a location within the guide body 11 that is coincident with the path of a driver member (e.g., the blade 42) of the fastener drive mechanism 32, so that when the blade 42 moves through a driving stroke, its driving end will intercept the fastener and carry that fastener to the fastener exit portion 10, at the bottom portion of the tool's exit area.

The battery pack 12 is connected to the battery connection section 92, which is disposed at the rear of the handle 94. The battery pack 12 provides electrical power for the controller, the electric motor 34 and other electrical devices within the power tool 1. The battery pack 12 is rechargeable, To this end, the battery pack 12 may be selectively removable from the handle 94 to allow recharging within a dedicated charging device.

Referring to FIGS. 3-6, the tool housing 2 is a hollow, rigid structure that encloses the fastener drive mechanism 32, the fastener drive reset mechanism 40, the fastener feed mechanism 20, and the fastener magazine 21. In addition, the tool housing 2 encloses other ancillary components of the power tool 1 including, but not limited to, the printed circuit board 14 and controller, the motor 34, the trigger switch 16, etcetera. The tool housing 2 is a composite of the outer layer 60 that provides an outer surface of the power tool housing, and the inner layer 80 that is disposed on an inner surface of at least a portion of the outer layer.

The outer layer 60 of the composite structure provides a rigid shell, and is thinner and more compliant relative to some conventional tool housings. The outer layer 60 is designed for controlled deformation without cracking. In some embodiments, the outer layer 60 is forged of a first material that may be a thermoplastic polymer. In some embodiments, the thermoplastic polymer has a high tensile strength and is very resistant to physical impacts and chemical corrosion. For example, suitable thermoplastic polymers include Acrylonitrile Butadiene Styrene-Polyamide (ABS-PA), Acrylonitrile Butadiene Styrene-Polyamide 12 (PA12) and Acrylonitrile Butadiene Styrene-Polyamide 6 (PA6). The ABS-PA blends provide a balance of material toughness and stiffness. In some embodiments, the thickness of the outer layer 60 may have a maximum thickness in a range of 10 mm to 3 mm, and a minimum thickness in a range of 5 mm to 1 mm. For example, in some embodiments, the thickness of the outer layer 60 may have a maximum thickness of 5 mm and a minimum thickness of 3 mm.

The outer layer of the tool housing 2 is an assembly of a concave first shell portion 61, a concave second shell portion 62 and a concave third shell portion 63. The first, second and third shell portions 61, 62, 63 are formed individually and, when assembled, define an enclosed interior space 67.

The first shell portion 61 overlies, a first lateral side of the power tool 1, for example a left side of the power tool 1. The second shell portion 62 overlies a second lateral side of the power tool 1, for example the right side of the power tool 1 so as to oppose the first shell portion 61. When the first shell portion 61 and the second shell portion 62 are assembled, they are positioned so that the respective facing portions 61a, 62a of their peripheral edges abut, and the facing portions 61a, 62a are joined together. The seam or joint line resulting from the assembly of the first and second shell portions 61, 62 is referred to as a first parting line 65. The first parting line 65 extends along a first circumference of the tool housing 2, where the first circumference resides in a first plane P1 that bifurcates the tool housing 2 into right and left sides. For example, the first plane P1 may correspond to the cross-section of the tool housing 2 shown in FIG. 1. In this configuration, the first shell portion 61 and the second shell portion 62 together provide the battery connection section 92, the handle 94, the secondary housing section 96 and a large portion of the main housing section 90.

The third shell portion 63 is a generally cup-shaped structure that closes an open top end of the main housing section 90, where the "top" of the tool housing 2 is identified using reference number 54. When the third shell portion 63 is assembled with the first and second shell portions 61, 62, the facing portion 63b of the peripheral edge of the third shell portion 63 abuts corresponding facing portions 61b, 62b of the peripheral edges of the first and second shell portions 61, 62, and the respective facing portions 63b, 61b, 62b are joined together. The seam or joint line resulting from the assembly of the third shell portion 63 with the first and second shell portions 61, 62 is referred to as a second parting line 66, The second parting line 66 extends along a second circumference of the tool housing 2, where the second circumference resides in a second plane P2 that is perpendicular to the first plane P1. The third shell portion 63 provides a top cap that corresponding to the remaining portion of the main housing section 90.

In some embodiments, the third shell portion 63 may correspond to a removable cap that is selectively attached to, and detached from, the remainder of the main housing section 90. Such a removable cap permits the servicing of internal wear components within the fastener drive mechanism 32. The third shell portion 63, in the form of a removable cap, may be secured to the remainder of the main housing section 90 using fasteners (not shown) such as screws, or alternatively via other types of mechanical connection such as a press fit, snap fit, threaded engagement, etcetera.

The first, second and, third shell portions 61, 62, 63 are joined together along the first parting line 65 and the second parting line 66 so as to provide a single, or mono, shell structure.

In some embodiments, the inward-facing surface 68 of the outer layer 60 is free of structurally reinforcing protrusions such as, but not limited to, ribs, at locations that face the inner layer 80.

Referring also to FIGS. 7-10, the inner layer 80 serves as a lining for the outer layer 60 such that an outward-facing surface 89 of the inner layer 80 faces the inward-facing surface 68 of the outer layer 60 without any intervening structures. In the illustrated embodiment, the inner layer 80 is free from adhesion to, and/or bonding to, the outer layer 60. However, in other embodiments, the inner layer 80 may be secured to the outer layer via adhesive, mechanical fasteners or other known methods. For example, the outer and inner layers 60, 80 may be bonded together if it is considered advantageous to the processing or performance of the power tool 1.

The outward-facing surface 89 of the inner layer 80 is contoured to correspond to the facing contours of the inward-facing surface 68 of the outer layer 60, whereby gaps between the inner layer 80 and the outer layer 60 are minimal or nonexistent.

The inner layer 80 is disposed between the outer layer 60 and internal components of the power tool 1. In some embodiments, the entire outer layer 60 is lined with the inner layer 80. In other embodiments, the inner layer 80 may be provided only at strategic locations of the tool housing 2. That is, the inner layer 80 may be provided in localized, predetermined locations where, for example, impact loads are likely to occur or at locations more prone to a housing failure.

When the power tool 1 is dropped, it may rotate in space until the heaviest portions face downward. Thus, when dropped, the front 50 and top 54 of the tool housing 2 may experience more impact loads than other parts of the tool housing 2. For this reason, in the illustrated embodiment, the inner layer 80 is disposed in the main housing section 90, and underlies the outer layer 60 along the front 50 and top 54 of the power tool 1. In other words, the inner layer 80 is disposed between the outer layer 60 and the fastener drive mechanism 32. In other locations where ergonomics requirements result in a complex shape, or heat loads need to be dissipated, the outer layer 60 can be thickened and the thickness of the inner layer 80 can be reduced or eliminated. In the illustrated embodiment, for example, the inner layer 80 is omitted from locations of the tool housing 2 that infrequently experience impact loads, such as the battery connection section 92, the handle 94 and the secondary housing section 96. The outer layer 60 may have a fast thickness in a first region of the tool housing 2 corresponding to locations in which the inner layer 80 underlies the outer layer 60, and a second thickness in a second region of the tool housing 2 corresponding to locations in which the inner layer is omitted such as the handle 94. Since the inner layer 80 reinforces and strengthens the outer layer 60, the first thickness is less than the second thickness. This approach optimizes areas of the housing for maximum functionality, while controlling weight and cost. This approach also minimizes any effects on the tool appearance and ergonomics.

The inner layer 80 is an assembly of an inner layer first portion 83 and an inner layer second portion 85. The inner layer first portion 83 has a U shaped cross section and is elongated along an axis that extends between the top 54 and bottom 56 of the power tool 1. The inner layer first portion 83 resides between the cylinder of the fastener drive mechanism 32 and the corresponding portion of the outer layer 60. In particular, the inner layer first portion 83 extends along the front of the power tool 1 and also extends along portions of the left and right lateral sides of the power tool 1. The inner layer second portion 85 is generally cup-shaped, and selves as a liner for the outer layer third shell portion 63. When the inner layer first and second portions 83, 85 are assembled to provide the inner layer 80, the facing portions 83a, 85a of the peripheral edges of the inner layer first and second portions 83, 85 abut each other along a third parting line 87.

Moreover, the inner layer 80 extends across both the first parting line 65 and the second parting line 66 in that the facing portions 83a, 85a of the peripheral edges of the inner layer 80 extend in parallel to the second parting line 66 and are offset (e.g., spaced apart) from the second parting line 66. In addition, portions 83b, 85b of the peripheral edge of the inner layer 80 that extend in parallel to the first parting line 65 are offset from the first parting line 65.

The inner layer first and second portions 83, 85 are shaped and dimensioned so that the third parting line 87 resides in a plane P3 that is parallel to the second plane P2, and is offset from the second plane P2 such that the third parting line 87 is closer to the top 54 of the power tool 1 than the second parting line 66. As a result, the inner layer first portion 83 extends across the second parting line 66, and the third parting line 87 resides inside the third shell portion 63.

The inner layer 80 of the composite structure supports the outer layer 60 and provides energy absorption during an impact loading of the tool, housing 2. In some embodiments, the inner layer 80 is a polymer foam. The polymer foam may be rigid or flexible, as required by the specific application. The inner layer 80 is more deformable and less dense than the outer layer 60. In particular, the inner layer 80 is at least one-third less dense than the outer layer 60. In some implementations, the inner layer 80 may be a foam having a density that is one tenth, one thirtieth or one fiftieth of the density of the outer layer 60. The resulting tool housing 2 has excellent compressive strength and energy absorption properties, while being resistant to breakage. This construction is well suited for lightweight and cost effective energy management in power tool housings.

For example, the inner layer 80 may be an Expanded Polyolefin (EPO). EPOs include expanded polyethylene (EPE), expanded polypropylene (EPP), expanded polybutylene (EPB) and copolymers of ethylene, propylene, etc. The most preferred EPO is expanded polypropylene (EPP) and its copolymers with ethylene and butylene. This polymer is selected to provide the desired physical properties, such as tensile strength, compressive strength, modulus of elasticity, density, molding temperature, etc. In some embodiments, the thickness of the inner layer 80 may be at least 1.5 times the thickness of the outer layer 60. In some embodiments, the thickness of the inner layer 80 may be 5 times, 10 times or 40 times the thickness of the outer layer 60, depending on the amount of energy absorption required for rough field usage or impact force. In use, the deformation properties of the outer layer 60 allow the outer layer 60 to compress against the underlying inner layer 80 with only a small amount of deformation.

In some embodiments, the inner layer 80 and the outer layer 60 are molded in separate processes. By molding the outer layer 60 in a separate process from the molding of the inner layer 80, the inner layer 80 can be configured to extend across the parting lines 65, 66. For example, when the tool housing 2 is viewed with the third shell portion 63 detached (FIG. 6), it can be seen that the first parting line 65 of the outer layer 60 is offset from the parallel peripheral edge portions 83b, 85b of the inner layer 80. In addition, the second parting line 66 of the outer layer is offset from third parting line 87. If the front 50 of the power tool 1 is subjected to a severe impact in the vicinity of the first and/or second parting lines 65, 66, the inner layer 80 will absorb the load. Moreover, since the inner layer 80 is extends across the parting, lines 65, 66 along the front of the power tool 1, the inner layer 80 will not separate in the vicinity of the parting lines 65, 66. That is, even if the parting lines 65, 66 separate due to an impact load, the underlying inner layer 80 does not separate at this location, providing a harrier between mechanisms disposed in the tool housing 2 and the environment. By this construction, the mechanism that underlies the inner layer 80 is protected by the inner layer 80, since the inner layer 80 provides a covering and provide energy absorption. This approach is also more cost effective than some other processes, since each molding process can be optimized for cycle time and material properties. By design, the internal surface geometry of the outer layer 60 nests in the underlying inner layer 80, because they are nearly identical.

In some embodiments, the outer and inner layers 60, 80 may be molded as an integral assembly. This approach may offer the maximum energy management opportunities, but may also increase cost and processing complexity. In some cases, the processing parameters may compromise the optimum material properties.

Molding the outer layer 60 separately from the inner layer 80 also offers the manufacturer benefits by allowing the impact resistance of an existing power tool to be improved. This is achieved by adding an internal layer of the second material to an inner surface of the power tool. This can be an economical approach to upgrading an existing power tool and may compensate for newer and much heavier batteries, without retooling the housing. Although the full benefit with respect to impact load resistance may not be realized by the addition of the internal layer, the incremental gain may give the power tool the desired added durability.

The composite tool housing 2 provides weight reduction benefits, since the wall thickness of the outer layer 60 is reduced relative to that of some conventional tool housings to create a durable structure. There is an immediate weight reduction in the overall tool, since all or most of the internal ribbing of a conventional tool housing can be replaced by the inner layer 80 having a continuous or nearly continuous foam structure. This construction is lightweight, and provides cost effective energy management in power tool housings.

Although the power tool 1 is described as being a gas-spring nailer, the nailer is not limited to having a gas-spring drive mechanism. For example, in other embodiments, the nailer may have a gas combustion driving mechanism, a mechanical spring diving mechanism or other driving mechanism appropriate to the desired application.

Although the tool housing 2 is described above with respect to a hand-held gas nailer power tool, the tool housing 2 is not limited to being used with a gas nailer. The tool housing 2 can be used with other types of milers such as pneumatic nailers or battery powered nailers. Moreover, the tool housing 2 is not limited to being used with hand-held nailers, and can be used other hand-held power tools, including, but not limited to, saws, sanders, grinders, paint sprayers, stirrers, hammers, jack hammers, etc.

Figure 11:
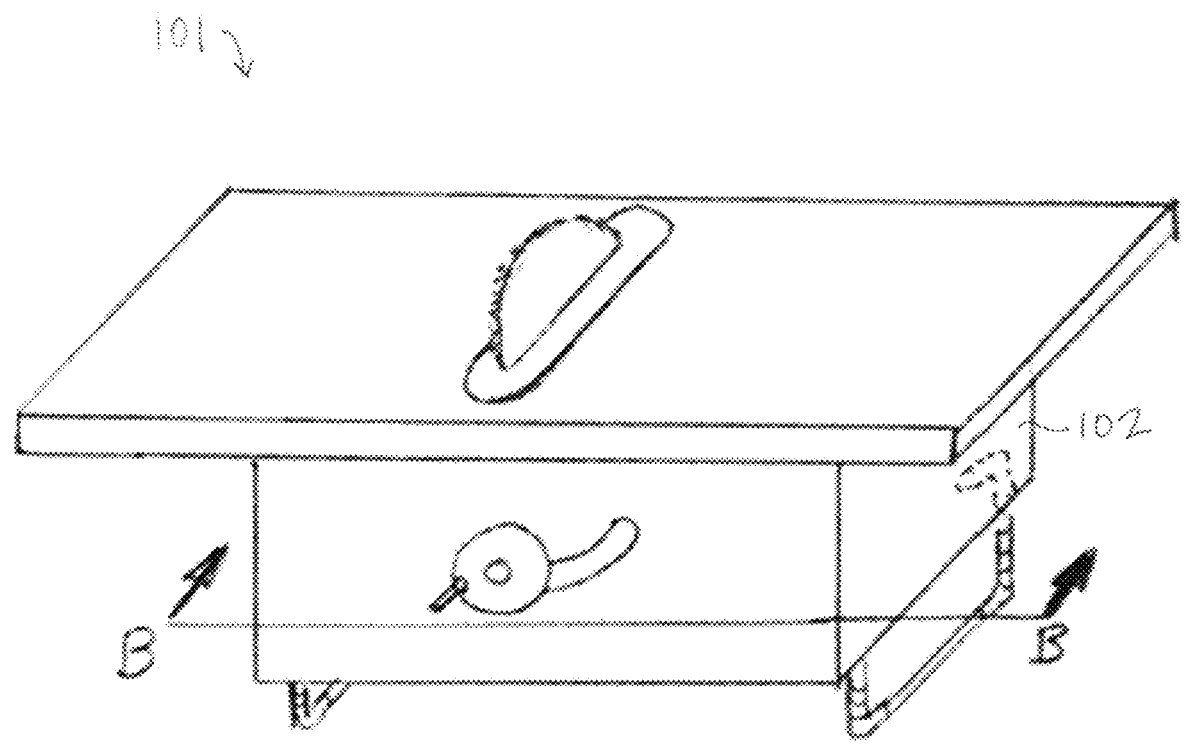
FIG. 11 is a perspective view of a composite housing of an alternative embodiment power tool.
Figure 12:
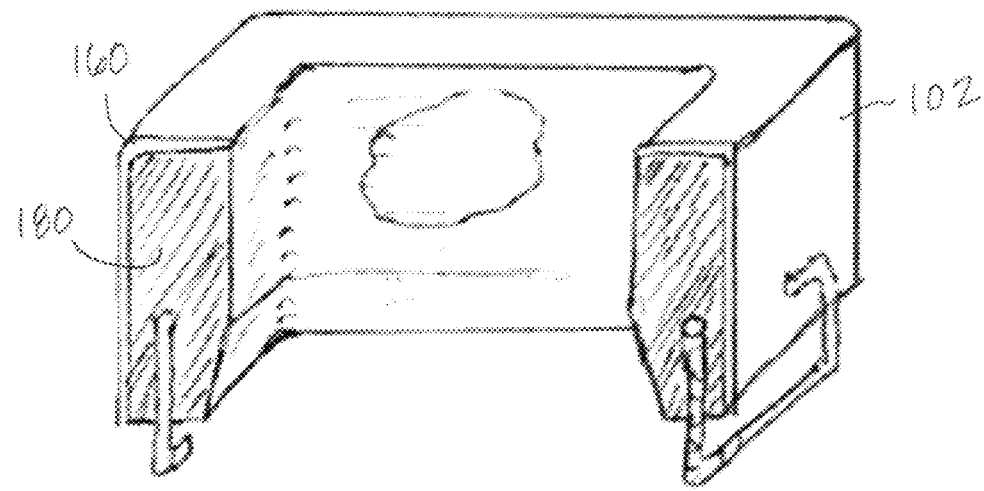
FIG. 12 is a perspective view of the composite housing of the tool of FIG. 11 as seen along line B-B, and shown with the table portion of the housing omitted to permit clear visualization of the composite housing.

Referring to FIGS. 11 and 12, the tool housing 2 is not limited to being used with hand-held power tools. For example, in some embodiments, an alternative embodiment tool housing 102 is used with a floor-standing power tool 101 such as a table saw, in which a saw blade 110 and a motor (not shown) that drives the saw blade are housed in a cabinet-type tool housing 102. The table saw 101 includes a planar work surface 104 that rests on the cabinet portion 105 of the tool housing 102, and the saw blade 110 may partially protrude through an opening in the work surface 104. The cabinet portion 105 may be supported relative to the ground by legs 106. The composite structure is provided in the cabinet 102, and includes an outer layer 160 and an inner layer 180 that provides further benefit because the expanded Poly-olefin facilitates the attachment of metal and non-foam elements in the molding process. Other portions of the table saw 101, such as the work surface 104 and/or legs 106 may not include the composite structure as required by the specific application.

For a hand-held tool, it is understood that the composite structure creates a more durable structure. For larger, non-hand held or cabinet-type power tools such as table saws, the composite structure creates a significant structural element. In the case of the table saw 101, the main tool housing 102 serves as a large box feature that enhances the structural integrity of the tool 101, and adds rigidity to the tool 101. As in the earlier embodiment, the composite structure also reduces the overall weight of the table saw 101.

Selective illustrative embodiments of the power tool including a composite housing are described above in some detail. It should be understood that only structures considered necessary for clarifying the power tool and the composite housing have been described herein. Other conventional structures, and those of ancillary and auxiliary components of the power tool and the composite housing, are assumed to be known and understood by those skilled in the art. Moreover, while a working example of the power tool including the composite housing has been described above, the power tool and/or the composite housing are not limited to the working example described above, but various design alterations may be carried out without departing from the power tool and/or the composite housing as set forth in the claims.

I claim:

1. A power tool comprising a tool housing and a mechanism disposed inside the tool housing, the tool housing including:
   an outer layer that provides an outer surface of the power tool housing, the outer layer comprising a first material; and
   an inner layer disposed on an inner surface of a first region of the outer layer, the inner layer comprising a second material,
   wherein
   the first material and the second material are polymers,
   the first material has a density that is at least three times the density of the second material,
   the outer layer is an assembly of a concave first shell portion and a concave second shell portion,
   the first shell portion is joined together with the second shell portion along a first parting line to provide an enclosed interior space that receives the mechanism,
   the inner layer is disposed between the first region of the outer layer and the mechanism,
   the inner layer is omitted from an inner surface of a second region of the outer layer, and
   the inner layer has a first peripheral edge portion that is offset relative to the first parting line such that the inner layer extends continuously across the first parting line.

2. The power tool of claim 1, wherein
   the outer layer is an assembly of the first shell portion, the second shell portion and a concave third shell portion,
   the third shell portion is joined together with the first shell portion and the second shell portion along a second parting line to provide the enclosed interior space that receives the mechanism, and
   the inner layer has a second peripheral edge portion that is offset relative to the second parting line such that the inner layer extends continuously across the second parting line.

3. The power tool of claim 2, wherein the inner layer is an assembly of a first inner layer portion and a second inner layer portion, the first inner layer portion abuts the second inner layer portion along a third parting line, and the third parting line is spaced apart from the second parting line.

4. The power tool of claim 1, wherein the inner layer underlies the outer layer such that an outward facing surface of the inner layer faces the inward-facing surface of the outer layer without any intervening structures, and the inner layer is free from adhesion to, and bonding to, the outer layer.

5. The power tool of claim 1, wherein an inward-facing surface of the outer layer is free of structurally reinforcing protrusions at locations that face the inner layer.

6. The power tool of claim 1, wherein
   the inner layer is omitted from an inner surface of a second region of the outer layer,
   the outer layer has a non-uniform thickness such that the outer layer has a first thickness in the first region of the tool housing and a second thickness in the second region of the tool housing, and
   the first thickness is less than the second thickness.

7. The power tool of claim 6 wherein
   the power tool is a hand-held fastener driving tool that includes:
      the mechanism disposed at a first end of the tool housing, the mechanism including fastener driving mechanism;
      a power supply disposed at a second end of the tool housing; and
      a handle that extends between the first end and the second end, and
   the first regio of the tool housing includes the first end, and
   the second region of the tool housing includes the handle.

8. The power tool of claim 6, wherein
   the power tool housing includes:
      a cabinet portion that receives the mechanism;
      a planar work surface that is supported on the cabinet portion; and
      support members that are configured to support the cabinet portion relative to an external support surface, and
   the first region of the tool housing corresponds to the cabinet, and the second region of the tool housing corresponds to the support members.

9. The power tool of claim 1, wherein
   the first material is a thermoplastic polymer, and
   the second material is a polymer foam.

10. The power tool of claim 1, wherein a thickness of the inner layer is at least 1.5 times the thickness of the outer layer.

11. A power tool comprising a tool housing and a mechanism disposed inside the tool housing, the tool housing including
   an outer layer that provides an outer surface of the power tool housing, and
   an inner layer disposed on an inner surface of a first region of the outer layer,
   wherein the outer layer is an assembly of a concave first shell portion and a concave second shell portion, the first shell portion joined together with the second shell portion along a first parting line to provide an enclosed interior space that receives the mechanism,
   the inner layer is disposed between the first region of the outer layer and the mechanism,
   the inner layer is omitted from an inner surface of a second region of the outer layer, and
   the inner layer has a first peripheral edge portion that is offset relative to the first parting line such that the inner layer extends continuously across first the parting line.

12. The power tool of claim 11, wherein
   the outer layer comprises a first material, the inner layer comprises a second material, and the first material has a density that is at least three times the density of the second material.

13. The power tool of claim 11, wherein the outer layer is an assembly of the first shell portion, the second shell portion and a concave third shell portion, the third shell portion is joined together with the first shell portion and the second shell portion along a second parting line to provide the enclosed interior space, and a second peripheral edge portion of the inner layer is offset relative to the second parting line such that the inner layer extends continuously across the second parting line.

14. The power tool of claim 13 wherein the inner layer is an assembly of a first inner layer portion and a second inner layer portion, the first inner layer portion abuts the second inner layer portion along a third parting line, and the third parting line is spaced apart from the second parting line.

15. The power tool of claim 11, wherein the inner layer underlies the outer layer such that an outward facing surface of the inner layer faces the inward-facing surface of the outer layer without any intervening structures, and the inner layer is free from adhesion to, and bonding to, the outer layer.

16. The power tool of claim 11, wherein the outer layer has a non-uniform thickness such that the outer layer has a first thickness in the first region of the tool housing and a second thickness in the second region of the tool housing, and the first thickness is less than the second thickness.

17. The power tool of claim 16, wherein the power tool is a hand-held fastener driving tool that includes:

the mechanism disposed at a first end of the tool housing, the mechanism including a fastener driving mechanism;

a power supply disposed at a second end of the tool housing; and a handle that extends between the first end and the second end, the first region of the tool housing includes the first end, and the second region of the tool housing includes the handle.

* * * * *

UNITED STATES PATENT AND TRADEMARK OFFICE
CERTIFICATE OF CORRECTION

| | |
|---|---|
| PATENT NO. | : 11,612,994 B2 |
| APPLICATION NO. | : 16/940694 |
| DATED | : March 28, 2023 |
| INVENTOR(S) | : Wierzchon |

It is certified that error appears in the above-identified patent and that said Letters Patent is hereby corrected as shown below:

In the Claims

In Claim 7:
At Column 12, Lines 21-22: "including fastener driving mechanism" should read --including a fastener driving mechanism--; and
At Column 12, Line 27: "the first regio of the tool housing" should read --the first region of the tool housing--.

Signed and Sealed this
Twentieth Day of June, 2023

*Katherine Kelly Vidal*

Katherine Kelly Vidal
*Director of the United States Patent and Trademark Office*